United States Patent [19]
Anderson et al.

[11] Patent Number: 6,163,816
[45] Date of Patent: *Dec. 19, 2000

[54] SYSTEM AND METHOD FOR RETRIEVING CAPABILITY PARAMETERS IN AN ELECTRONIC IMAGING DEVICE

[75] Inventors: Eric Anderson, San Jose; Patricia Scardino, Fremont, both of Calif.

[73] Assignee: FlashPoint Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/920,424

[22] Filed: Aug. 29, 1997

[51] Int. Cl.⁷ .................................................. G06F 13/00
[52] U.S. Cl. ............................ 710/8; 710/14; 348/207; 348/220; 396/57; 396/64
[58] Field of Search ................................ 348/206, 207, 348/220; 395/705; 710/5–14; 396/236, 294, 57, 64

[56] References Cited

U.S. PATENT DOCUMENTS

| | | | |
|---|---|---|---|
| 5,034,804 | 7/1991 | Sasaki et al. | 348/232 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,541,656 | 7/1996 | Kare et al. | 348/334 |
| 5,608,491 | 3/1997 | Sasagaki et al. | 396/243 |
| 5,627,623 | 5/1997 | Sasagaki et al. | 396/299 |
| 5,640,204 | 6/1997 | Tsutsui | 348/231 |
| 5,740,436 | 4/1998 | Furter | 359/72 |
| 5,745,808 | 4/1998 | Tintera | 396/236 |
| 5,754,227 | 5/1998 | Fukuoka | 348/232 |
| 5,777,876 | 7/1998 | Beauchesne | 364/468.01 |
| 5,819,107 | 10/1998 | Lichtman et al. | 395/828 |
| 5,835,772 | 11/1998 | Thurlo | 395/705 |
| 5,848,193 | 12/1998 | Garcia | 382/232 |
| 5,867,686 | 2/1999 | Conner et al. | 395/495 |
| 5,870,464 | 2/1999 | Brewser et al. | 379/219 |
| 6,005,613 | 12/1999 | Endsley et al. | 348/231 |
| 6,006,039 | 12/1999 | Steinberg et al. | 396/57 |

*Primary Examiner*—Christopher B. Shin
*Attorney, Agent, or Firm*—Sawyer Law Group LLP

[57] ABSTRACT

The present invention includes a system and method for obtaining a set of capability parameters for an electronic imaging device. The invention includes a series of capability parameter storage locations for containing capability parameter value sets, a GetCameraCapabilities command for retrieving these capability parameter value sets, and a parameter manager device for executing the GetCameraCapabilities command to retrieve the capability parameter value sets.

17 Claims, 13 Drawing Sheets

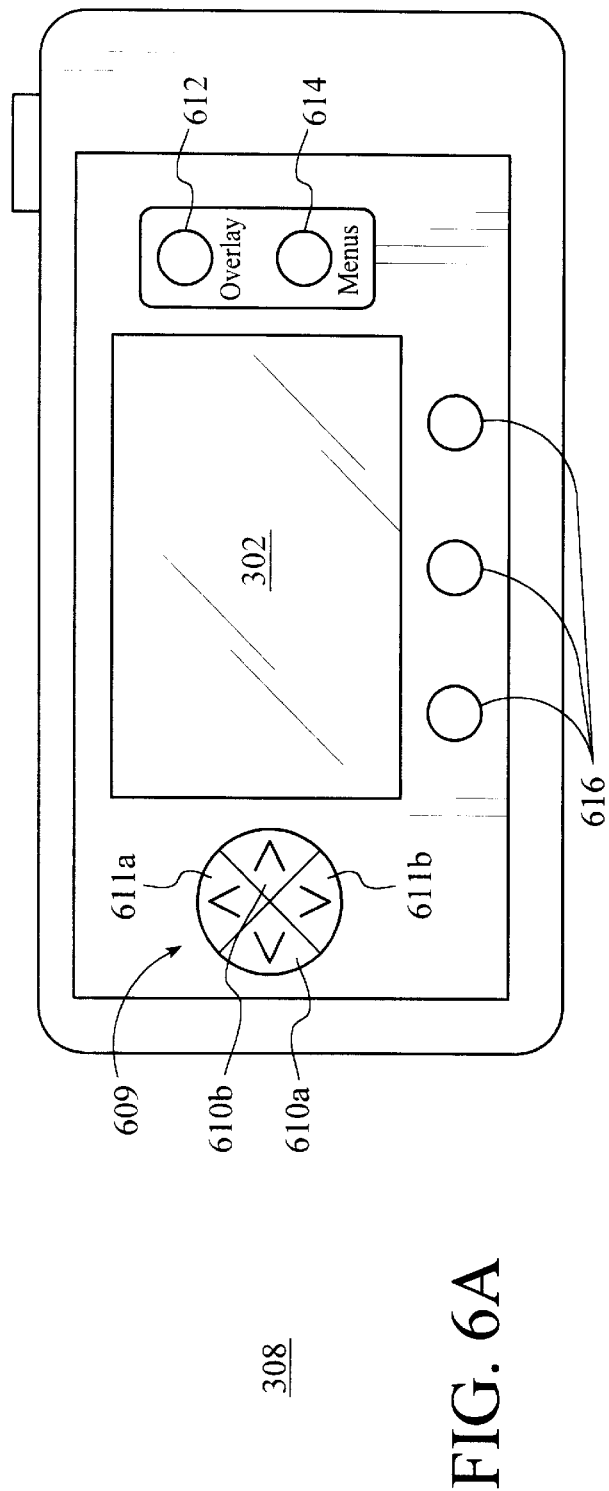
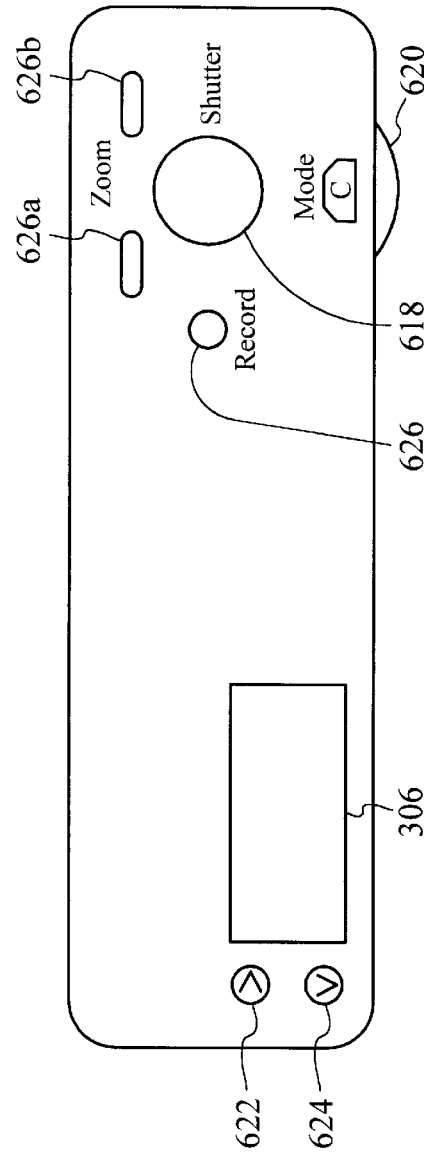
FIG. 6A
FIG. 6B

SYSTEM AND METHOD FOR RETRIEVING CAPABILITY PARAMETERS IN AN ELECTRONIC IMAGING DEVICE

CROSS-REFERENCE TO RELATED APPLICATION

This application relates to co-pending U.S. patent application Ser. No. 08/851,667, entitled "A Method and Apparatus For Integrating A Digital Camera User Interface Across Multiple Operating Modes," filed on May 5, 1997, which subject matter is hereby incorporated by reference. The above cross-referenced patent application has been commonly assigned to the Assignee of the present patent application.

BACKGROUND OF THE INVENTION

1. Field of the Invention

This invention relates generally to electronic imaging devices and more particularly to a system and method for retrieving capability parameters in an electronic imaging device.

2. Description of the Background Art

In conventional computer systems, when an interrogating computer wants information from a remote peripheral device, the computer may need to know the capability parameters of the peripheral device or at least the structure of the capability parameters. Capability parameters are features or functions which control the performance and utility of a given peripheral device, and which may either have several values for selection by the user or have a fixed value. As an example, early disk drives required the host computer to know the number of surfaces, heads, sectors, and tracks before communicating with the disk. Later disks such as the Small Computer System Interconnect (SCSI) and Integrated Drive Electronics (IDE) types allow the host to interrogate the disk for the numerical values of these parameters, but the host still must know ahead of time that the disk is organized by surfaces, heads, sectors, and tracks.

Digital cameras are a relatively recent invention. One of their attractions is their ability to be connected to an arbitrary host computer for image editing and display of captured images. In order for the host computer to perform these functions with the digital camera, the host may require the technical capability parameters of the camera. For example, the host may need to know parameter ranges for lens focus, exposure settings, color balance, and many other capability parameters. Because different digital cameras vary widely in their capabilities and features, there is no standardized set of capability parameters.

Since the set of capability parameters differs from camera to camera, it may be necessary to input the number and structure of the capability parameters into each host computer when that computer connects with a particular digital camera. Several conventional methods are currently used to enter this data. These methods include installation of the data from a floppy disk, manual entry of the data from a printed manual, or downloading from a camera manufacture's world-wide-web page. While none of these methods are particularly onerous for the camera owner's own computer, they limit the portability and flexibility of use which is inherent in digital cameras. The user of a digital camera would likely prefer to be able to plug the camera into host computers at the homes of friends, at the office, at customer sites and at many other locations. Each of the current methods would require the camera user to bring along either a floppy disk or the camera manual, or to ensure Internet access for potential use sites.

It is also possible that the digital camera user will wish to interrogate the camera for its capability parameters from the user interface of the external host computer. There may be occasions where the user will not require the host computer to manipulate the digital camera using application software but that the user will merely need to view the capability parameter data. The user could view this data if it were simply passed through from the digital camera to the viewing screen of the external host computer. However there currently exists no method for interrogating an unknown digital camera without knowing the capability parameters first.

Finally, it is possible that applications running in the computer of the digital camera will need to know the capability parameters of the digital camera. The application may either require the capability parameters for setting and controlling the digital camera, or the application may simply need to present the capability parameters to the user of the digital camera on the Liquid Crystal Display (LCD) of the digital camera. Using existing methods for obtaining the capability parameters requires user intervention, either through manual entry of capability parameters or through the attachment of a data storage device such as a flash memory card. This requirement for user intervention interferes with the potential flexibility of the digital camera.

Therefore, for all of the foregoing reasons, an improved system and method are needed for obtaining a set of capability parameters for an electronic imaging device.

SUMMARY OF THE INVENTION

In accordance with the present invention, a system and method are disclosed for obtaining a set of capability parameters for an electronic imaging device. The invention includes a modularized series of capability parameter storage locations for containing capability parameter value sets, a GetCameraCapabilities command for retrieving these capability parameter value sets, and a parameter manager device for executing the GetCameraCapabilities command to retrieve the capability parameter value sets.

The GetCameraCapabilities command may retrieve the capability parameter value sets in several ways. In one embodiment of the present invention, if the GetCameraCapabilities command is issued with the capability parameter abbreviated name field (called the PName field) set to all nulls, then the parameter manager device will interpret this as requesting a complete set of all of the capability parameters. The parameter manager first returns a numerical value called ResLength, which typically will be the number of different capability parameters which the interrogated camera supports. After the parameter manager returns the ResLength, it then sends the value sets for all of the capability parameters supported by the camera.

In a second embodiment of the present invention, if the GetCameraCapabilities command is issued with the PName field set to all nulls, then the parameter manager device will interpret this as requesting a set of all of those capability parameters which are not included in a specified core camera capability parameters set. The parameter manager first returns ResLength, which typically will be the number of different capability parameters not included in the specified core camera capability parameters that the interrogated camera supports. After the parameter manager returns the ResLength, it then sends the value sets for all of the capability parameters which are not included in the specified core camera capability parameters supported by the camera.

If either of the foregoing embodiments of the present invention issues a GetCameraCapabilities command with the PName field set to a non-null value, the parameter manager interprets this as a request for the value set corresponding to the specific PName capability parameter. In this case, the value of ResLength returned is 1, and the single value set corresponding to the specific PName capability parameter is returned following ResLength.

The imaging device user is thus able to more efficiently and effectively obtain sets of capability parameters for the electronic imaging device, in accordance with the present invention.

BRIEF DESCRIPTION OF THE DRAWINGS

FIG. 6A is an elevation view of one embodiment for the back of the FIG. 1 camera;

FIG. 6B is a plan view of one embodiment for the top of the FIG. 1 camera;

DETAILED DESCRIPTION OF THE PREFERRED EMBODIMENT

The present invention relates to an improvement in electronic imaging devices, including digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus,, the present invention is not intended to be limited to the embodiment shown but is to be accorded the widest scope consistent with the principles and features described herein.

The present invention includes a system and method for retrieving capability parameters in an electronic imaging device. The invention includes a series of capability parameter storage locations for containing capability parameter value sets, a GetCameraCapabilities command for retrieving these capability parameter value sets, and a parameter manager device for executing the GetCameraCapabilities command to retrieve the capability parameter value sets.

Figure 1:
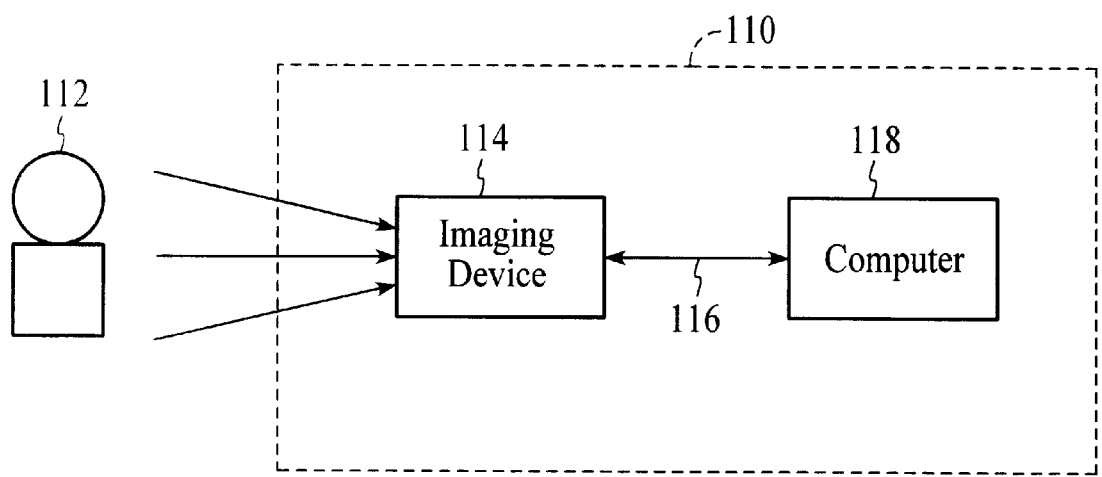
FIG. 1 is a block diagram of a digital camera, according to the present invention.

Referring now to FIG. 1, a block diagram of a digital camera 110 for use in accordance with the present invention is shown. Camera 110 preferably includes an imaging device 114, a system bus 116 and a computer 118. Imaging device 114 is optically coupled to an object 112 and electrically coupled via system bus 116 to computer 118. Once imaging device 114 is focused on object 112 and, by means of a capture button or some other means, camera 110 is instructed to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
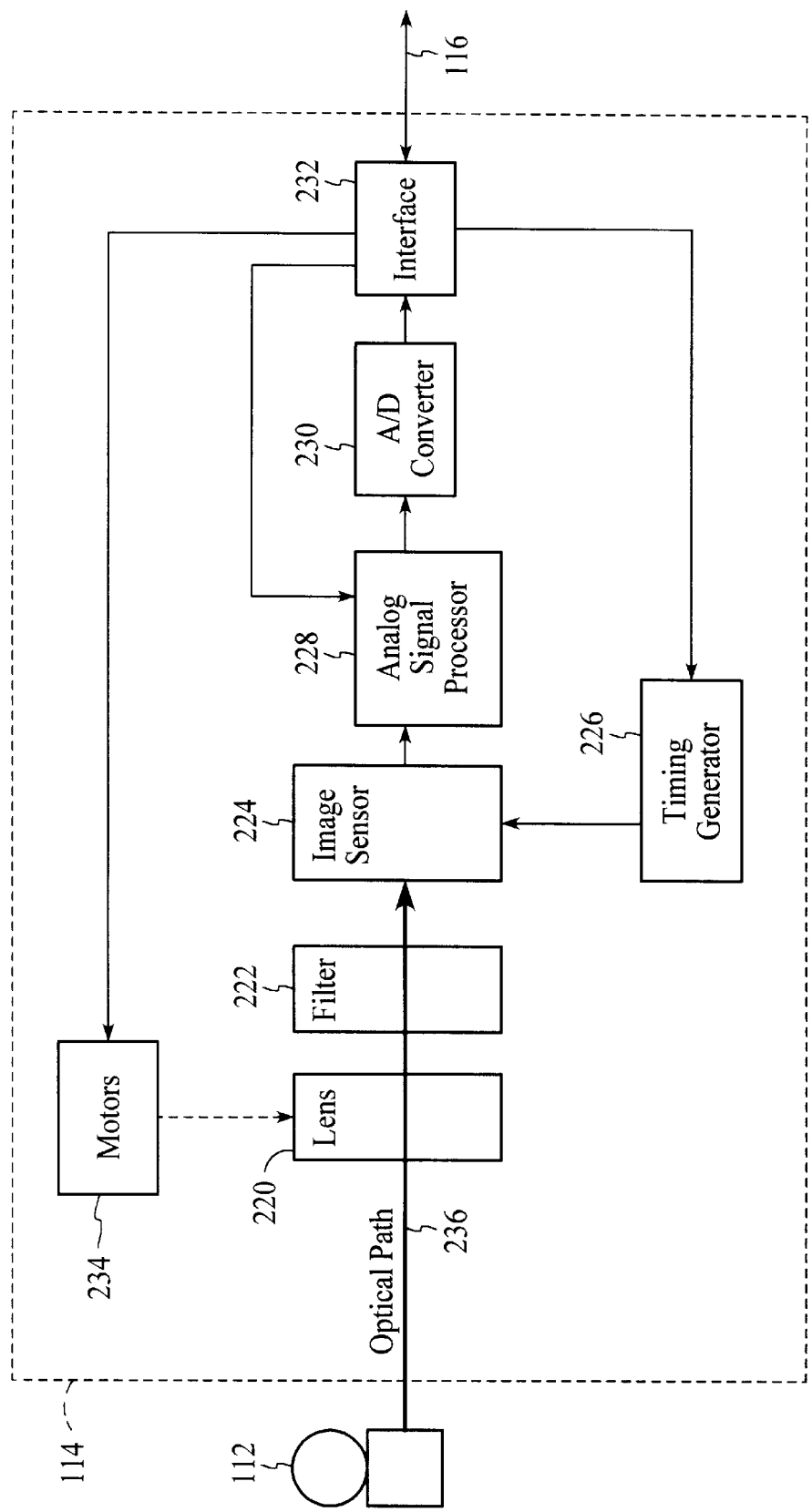
FIG. 2 is a block diagram of one embodiment for the imaging device of FIG. 1.

Referring now to FIG. 2, a block diagram of one embodiment of imaging device 114 is shown. Imaging device 114 typically includes a lens 220 having an iris, a filter 222, an image sensor 224, a timing generator 226, an analog signal processor (ASP) 228, an analog-to-digital (A/D) converter 230, an interface 232, and one or more motors 234.

Imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
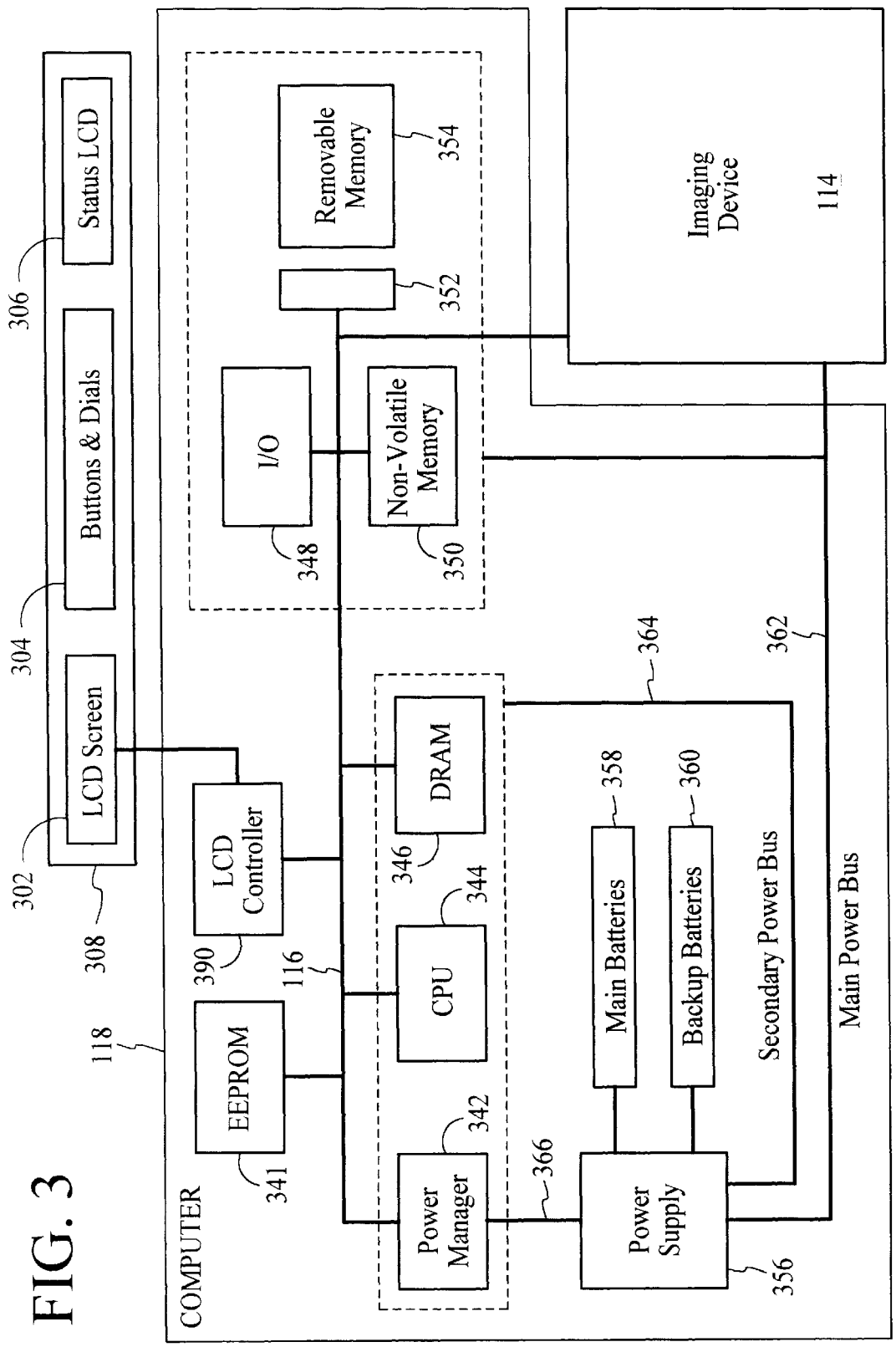
FIG. 3 is a block diagram of one embodiment for the computer of FIG. 1.

Referring now to FIG. 3, a block diagram of one embodiment for computer 118 is shown. System bus 116 provides connection paths between imaging device 114, electrically-erasable programmable read-only memory (EEPROM) 341, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. In alternate embodiments, camera 110 may also readily be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions. Liquid Crystal Display (LCD) controller 390 accesses DRAM 346 and transfers processed image data to LCD screen 302 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 304, and an optional status LCD 306, which, in addition to LCD screen 302, are the hardware elements of the camera's user interface 308.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
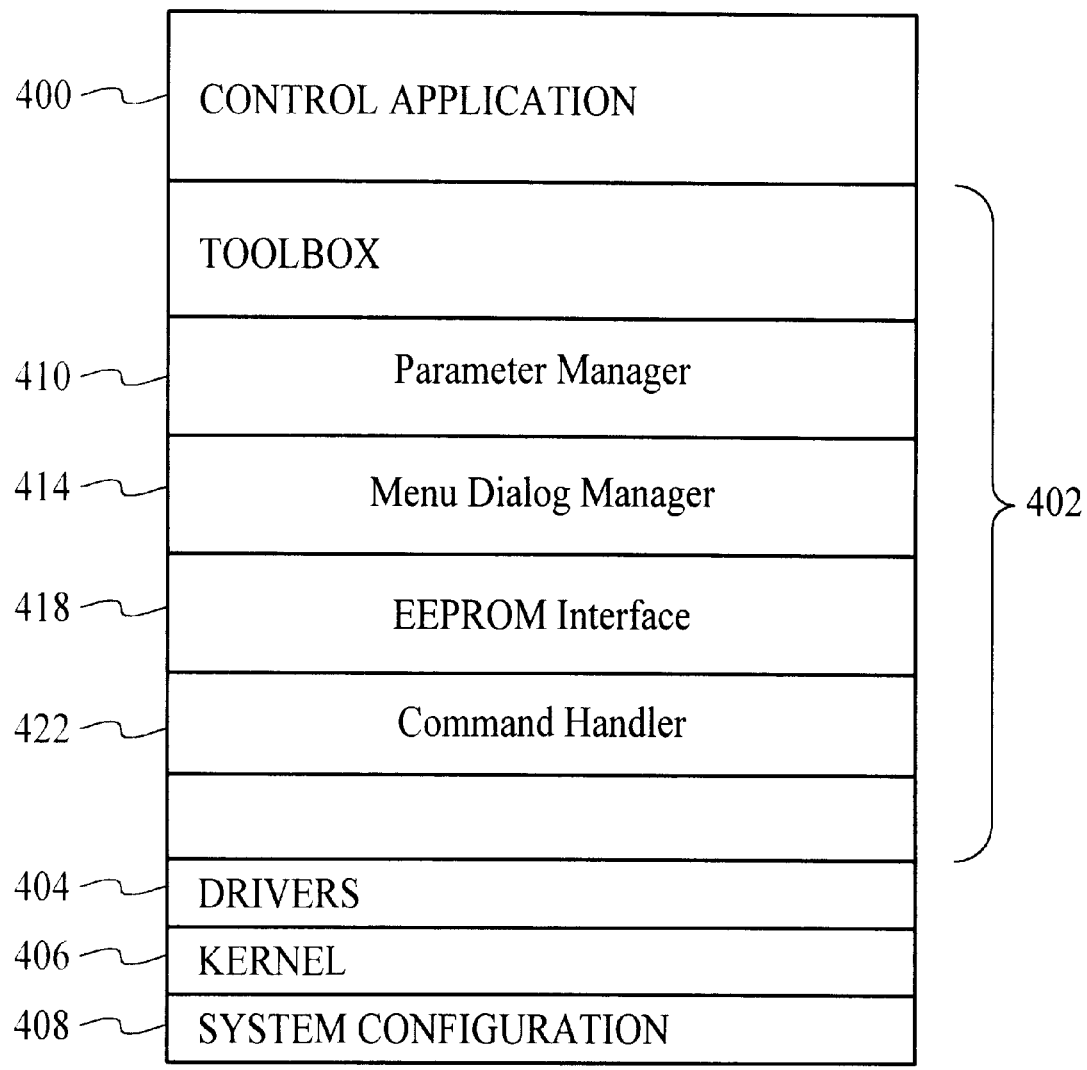
FIG. 4 is a memory map of one embodiment of the non-volatile memory of FIG. 3.

Referring now to FIG. 4, a memory map showing one embodiment of non-volatile memory 350 is shown. In the FIG. 4 embodiment, non-volatile memory 350 includes control application 400, toolbox 402, drivers 404, kernel 406 and system configuration 408. Control application 400 includes program instructions for controlling and coordinating the various functions of camera 110. Toolbox 402 contains selected function modules including parameter manager 410, menu dialog manager 414, EEPROM interface 418 and command handler 422.

Parameter manager 410 includes software routines which control and coordinate various operating parameters in camera 110, according to the present invention. Parameter manager 410 is further discussed below in conjunction with FIGS. 7–12. Menu dialog manager 414 includes software routines which coordinate functions related to the user interface 308, including displaying information on LCD screen 302 and handling information input from buttons 304. EEPROM interface 418 coordinates communications to and from EEPROM 341 via system bus 116. Command handler 422 accesses and handles various system commands and advantageously provides the commands to the appropriate destination within camera 110.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics.

Figure 5:
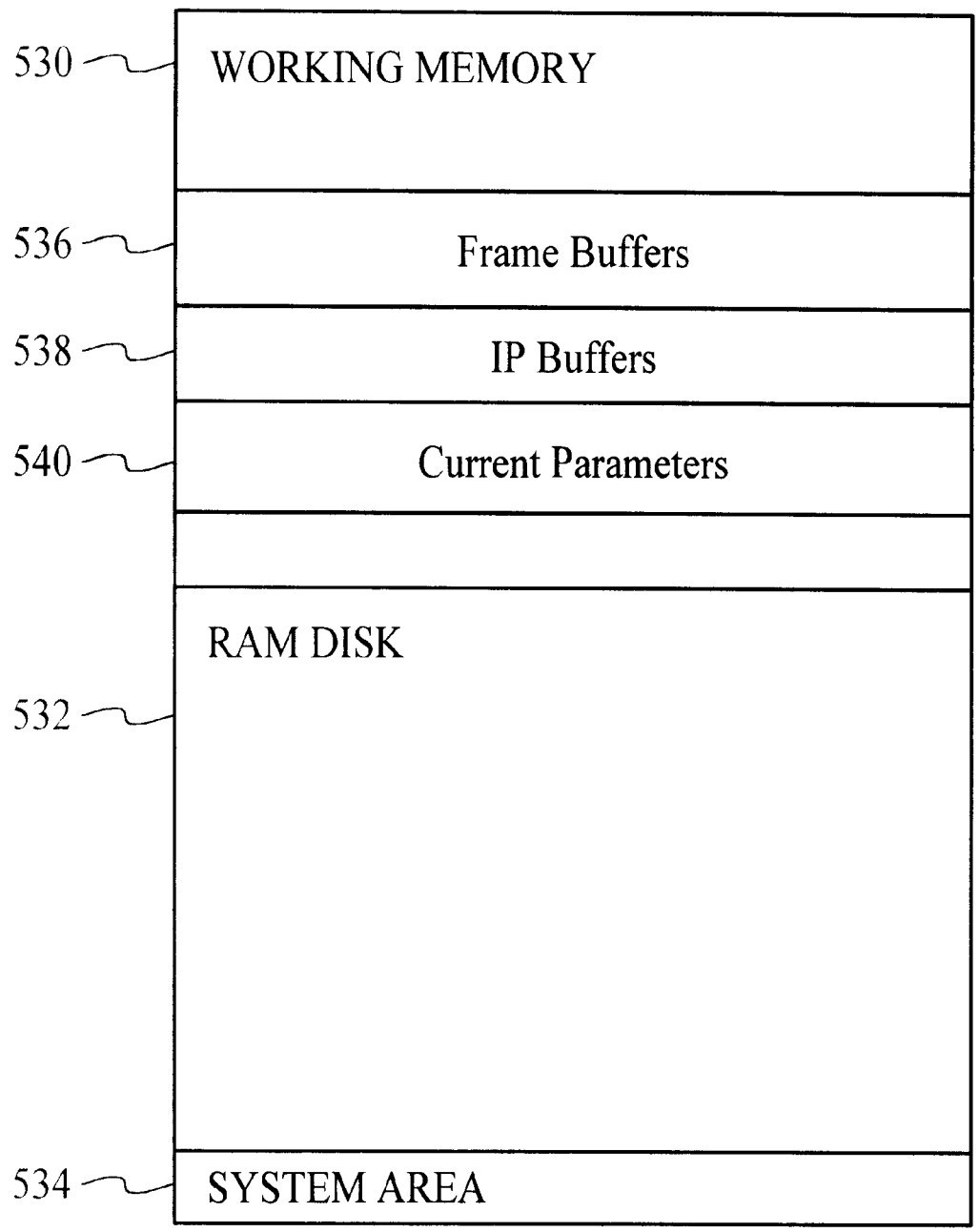
FIG. 5 is a memory map of one embodiment of the dynamic random-access memory of FIG. 3.

Referring now to FIG. 5, a memory map showing one embodiment of dynamic random-access-memory (DRAM) 346 is shown. In the FIG. 5 embodiment, DRAM 346 includes RAM disk 532, a system area 534, and working memory 530.

RAM disk 532 is a memory area used for storing raw and compressed image data and typically is organized in a sectored format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes input buffers 538 for initially storing sets of raw image data received from imaging device 114 for image conversion, and frame buffers 536 for storing data for display on the LCD screen 302.

In the preferred embodiment, a conversion process is performed by a live view generation program, which is stored in non-volatile memory 350 and executed on CPU 344. However, the conversion process can also be implemented using hardware. Referring again to FIG. 3, during the execution of the live view generation program (not shown), CPU 344 takes the raw image data from input buffers 538 in CCD format and performs color space conversion on the data. The conversions process performs gamma correction and converts the raw CCD data into either a Red Green Blue (RGB) or YCC color format which is compatible with the LCD screen 302. After the conversion, CPU 344 stores the image data in frame buffers 536. The LCD controller 390 then transfers the processed image data from the frame buffers to the LCD screen 302 (via an optional analog converter) for display.

Working memory 346 further contains current parameters 540 which preferably include current settings for a wide variety of operational and functional attributes of camera 110.

FIGS. 6A and 6B are diagrams depicting the preferable hardware components of the camera's 110 user interface 308. FIG. 6A is a back view of camera 110 showing the LCD screen 302, a four-way navigation control button 609, an overlay button 612, a menu button 614, and a set of programmable soft keys 616. FIG. 6B is a top view of camera 110 showing a shutter button 618, and a mode dial 620. The camera may optionally include status LCD 306, status LCD scroll and select buttons 622 and 624, a sound record button 626, and zoom-in, zoom-out buttons 626a and 626b.

The user interface 308 includes several different operating modes for supporting various camera functions. Although the digital camera includes multiple modes, the modes relevant to this description are review mode, menu mode, and capture (record) mode. In review mode, the camera 110 supports the actions of reviewing camera contents, editing and sorting images, and printing and transferring images. In menu mode, the camera 110 allows the user to manipulate camera settings and to edit and organize captured images. In capture mode, the camera 110 supports the actions of preparing to capture an image, and capturing an image through the use of either the LCD screen 302 or the status LCD 306.

The user switches between the review, menu, and capture modes, using the mode dial 620. When the camera is placed into a particular mode, that mode's default screen appears in the LCD screen 302 in which a set of mode-specific items, such as images, icons, and text, are displayed.

Figure 7:
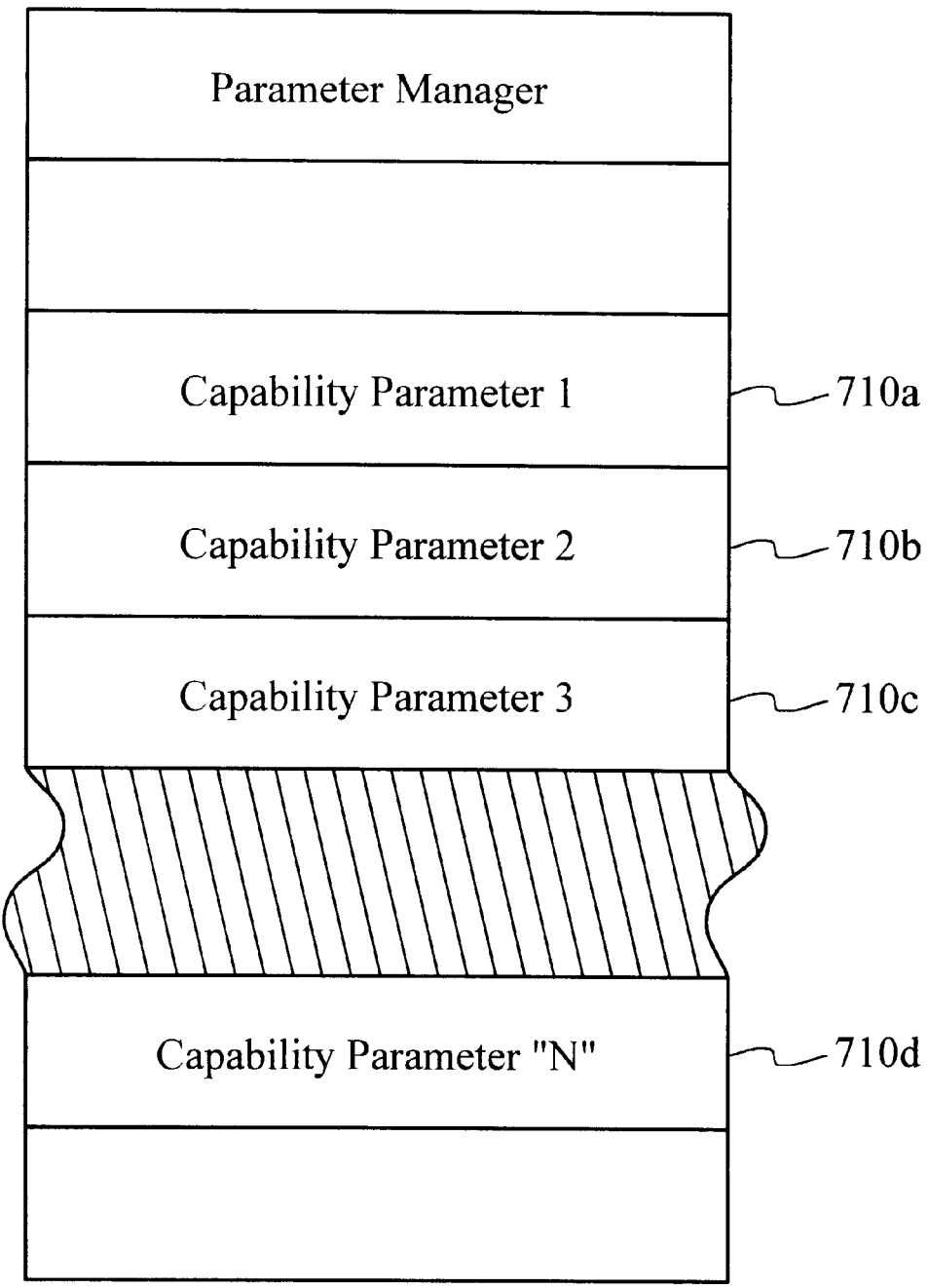
FIG. 7 is a memory map of one embodiment for the capability parameters in the parameter manager of FIG. 4.

Referring now to FIG. 7, a memory map of part of the non-volatile memory 350 shows one embodiment for the capability parameters contained within the parameter manager 410. In addition to comprising executable software, parameter manager 410 includes capability parameter 1 (710(*a*)) through capability parameter "N" (710(*d*)) which each preferably includes, but is not limited to, the capability for various operational and functional attributes of camera 110. In the preferred embodiment, there are three basic formats for capability parameters. The formats are called "list of values" format, "range of values" format, and "fixed value" format. The first two of these formats are discussed in detail below in conjunction with FIGS. 8A and 8B. The third format, the fixed value format, simply returns a fixed value for a camera's parameter. For example, a capability parameter for camera name returns a user-defined string.

Specific preferred examples for capability parameter 1 (710(*a*)) through capability parameter "N" (710(*d*)) are provided below in TABLE I. However, various other capability parameters not listed in TABLE I are equally possible in other embodiments.

TABLE I

| PNAME | PARAMETER DESCRIPTION | VALUE TYPE | VALUE RANGE |
|---|---|---|---|
| xmod | Exposure mode specification | UInteger List | 1 = Auto<br>2 = Shutter priority<br>3 = Aperture priority<br>4 = Gain priority<br>5 = Manual |
| fmod | Focus mode specification | UInteger List | 1 = Auto<br>2 = Program<br>3 = Manual |
| smod | Strobe mode specification | UInteger List | 0 = Off<br>1 = Auto<br>2 = Fill<br>3 = Slave<br>4 = Sync |
| zpos | Zoom position specification | UInteger List | 100 = 1X (no zoom)<br>200 = 2X<br>300 = 3X |
| shut | Shutter speed specification; measured in steps, with 16666 being equivalent to 1/60 second | UInteger | 125 through 4000000 |
| fdst | Focus distance specification; measured in centimeters, with 65535 being infinity | UInteger | 30 through 65535 |

Figure 8A:
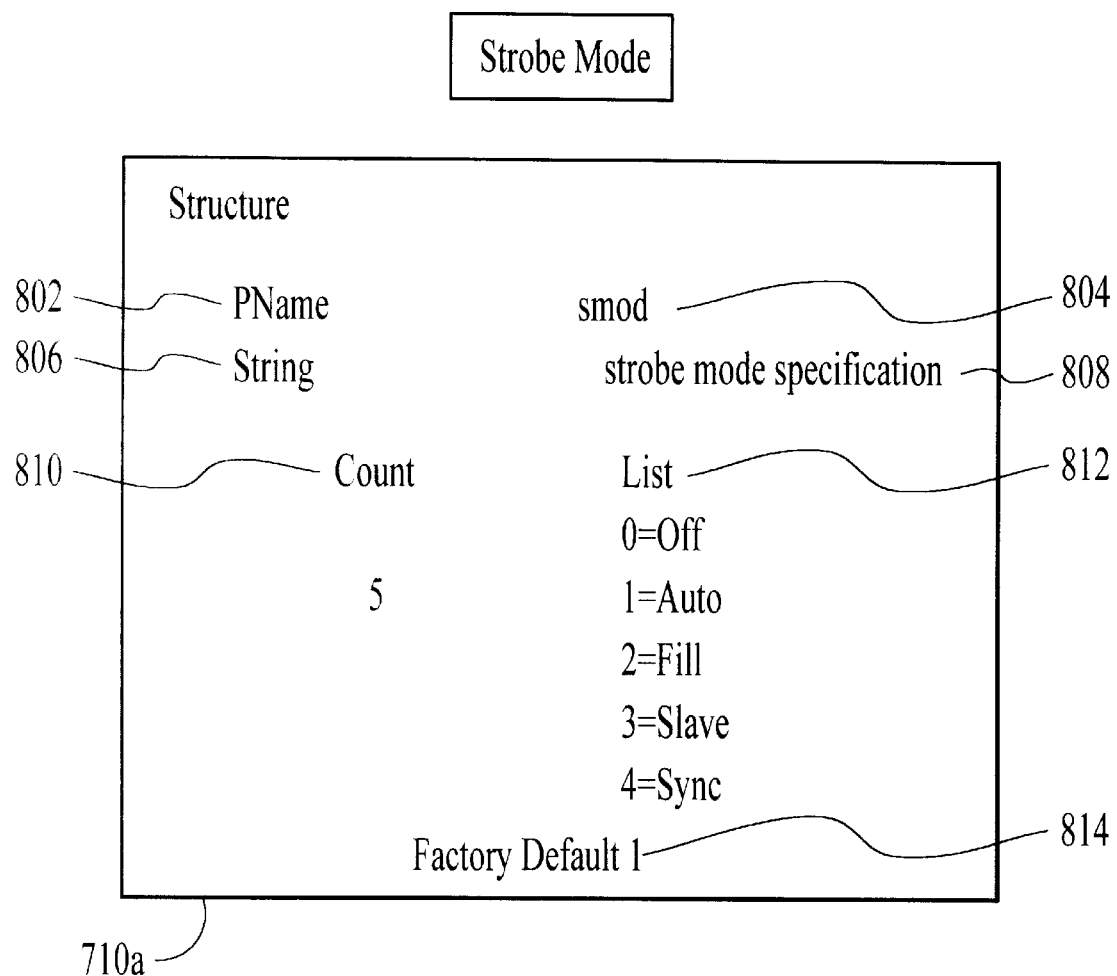
FIG. 8A is a detailed view of the structure of an exemplary capability parameters in list form, in accordance with the present invention.

Referring now to FIG. 8A, a detailed view of the structure of an exemplary capability parameter 710(*a*) in "list of values" format is shown. In FIG. 8A, the capability parameter for "strobe mode specification" has been chosen to illustrate a capability parameter in "list of values" format. In the preferred embodiment, each "list of values" capability parameter typically contains a PName 802 comprising 32 bits containing 4 ASCII characters, which in this exemplary case is the character set "smod" 804. Additionally each "list of values" capability parameter typically contains a text string 806 containing a description of the capability parameter 808, which in the FIG. 8A example is "strobe mode specification". The description of the capability parameter 808 will, in each case, be a text string readable by a human user of the digital camera.

In the specific case of a capability parameter in "list of values" format, the value set for the capability parameter contains a variable (of type unsigned integer) called count 810 and a value list 812 which includes a list of integers and corresponding string variables. In the FIG. 8A example, "0" is associated with "Off", "1" is associated with "Auto", "2" is associated with "Fill", "3" is associated with "Slave", and "4" is associated with "Sync". In the preferred embodiment, count 810 contains a value which is the total number of integers present in value list 812. In the FIG. 8A example, count 810 contains the value "5".

The "list of values" format also typically includes a factory default setting 814. The factory default setting 814 contains a value corresponding to a value in list 812 which describes the appropriate factory default value. In the FIG. 8A example, factory default 814 is associated with count value "1", which corresponds to the element "Auto".

Figure 8B:
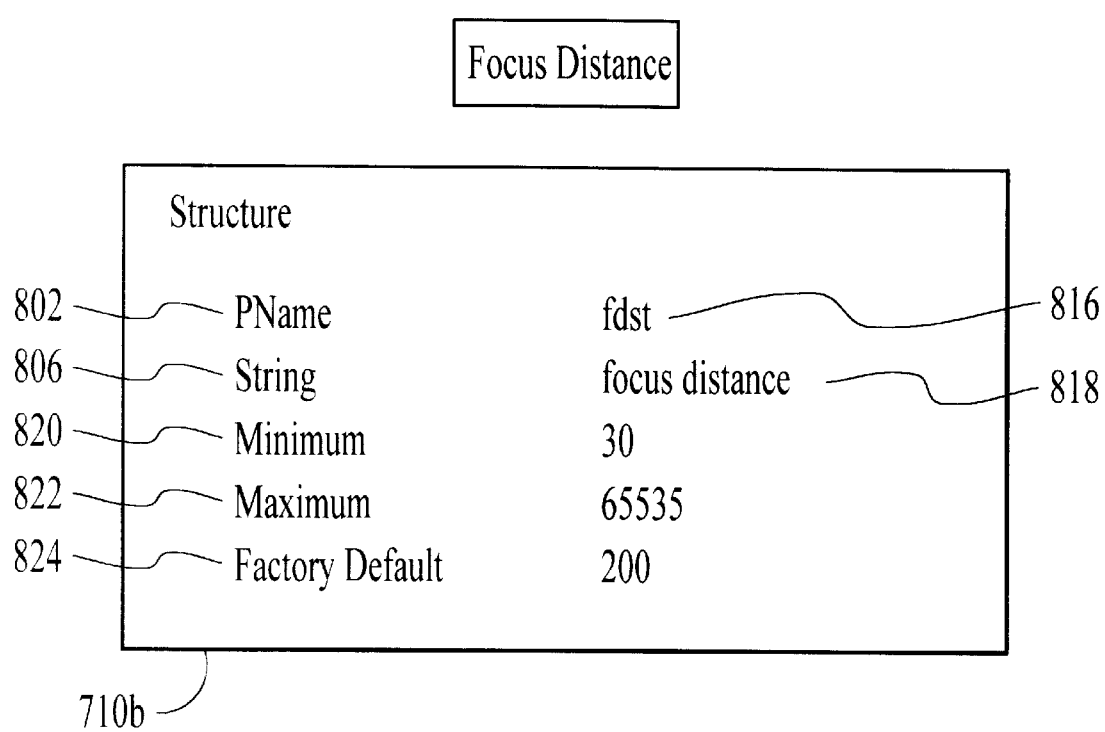
FIG. 8B is a detailed view of the structure of an exemplary capability parameter in range of values form, in accordance with the present invention.

Referring now to FIG. 8B, a detailed view of the structure of an exemplary capability parameter 710(*b*) in "range of values" format is shown. In FIG. 8B, the capability parameter for "focus distance specification" has been chosen to illustrate a capability parameter in "range of values" format. In the preferred embodiment, each "range of values" capability parameter typically contains a PName 802 comprising 32 bits containing 4 ASCII characters, which in this second exemplary case is the character set "fdst" 816. Again each "range of values" capability parameter typically contains a text string 806 containing a description 818 of the particular capability parameter. In the FIG. 8B example, description 818 is "focus distance", meaning that the numerical values are focal distances in centimeters.

In the specific case of a capability parameter in "range of values" format, the value set of the capability parameter contains three variables (of type unsigned or signed integer) which are called minimum 820, maximum 822, and factory default 824. In the FIG. 8B example of the focus distance capability parameter, the minimum 820 contains the value 30, the maximum 822 contains the value 65535, and the factory default 824 contains the value 200.

It is important to note in the examples given above in FIGS. 8A and 8B that all of the human language readable content is modularized in the text string 806 and when necessary in the list 812. The only part of the value set for the capability parameters examined in FIGS. 8A and 8B which would need changing for the purpose of human language localization would be these text strings 806 and lists 812. For example, if a batch of digital cameras was ordered for use in France, the modularity of the human language content would allow the digital camera's manufacturer to more easily change the capability parameter value sets so that the human language readable content would be in the French language. Alternatively, in a multiple language camera, multiple sets of strings can be utilized, where the current set is selected by the current language settings in the camera Referring now to FIG. 9, the flow of the commands and information between the computer 118 of digital camera 110 and an external host computer system 910 is shown. In the FIG. 9 embodiment, the external host computer system 910 provides the GetCameraCapabilities command to I/O interface 348 via line 912. In the preferred embodiment of the invention, the interface lines 912 and 918 may be an industry standard Universal Serial Bus (USB) interface. Computer 118 receives the GetCameraCapabilities command from the I/O interface 348, and responsively passes the command to CPU 344 via system bus 116. CPU 344, acting upon the GetCameraCapabilities command and using the parameter manager 410 software, accesses the capability data contained in parameter manager 410 via line 914. Parameter manager 410 then transfers the capability data via line 916 and system bus 116 to the I/O interface 348 which responsively provides the capability data to external host computer system 910.

Figure 9:
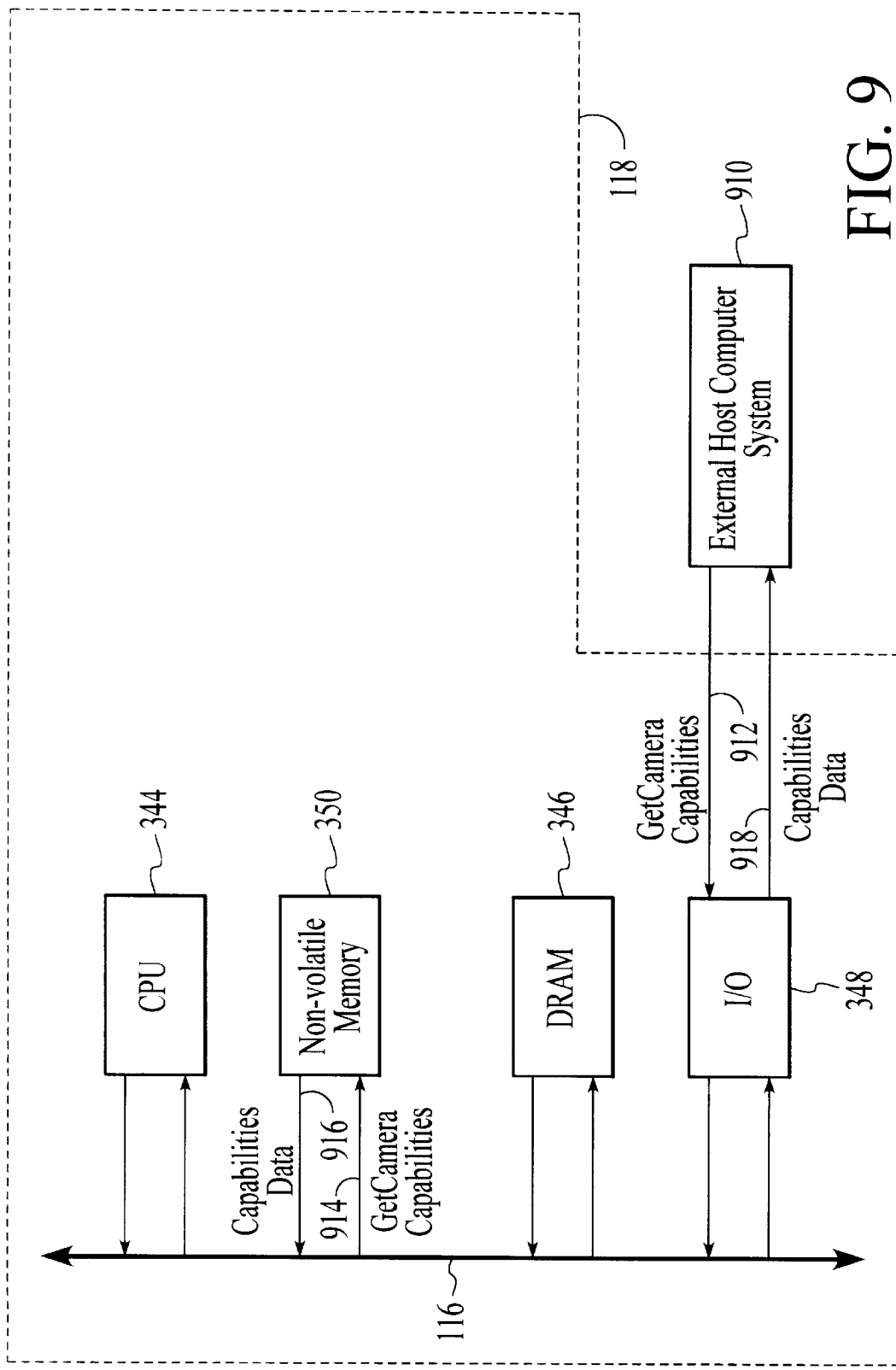
FIG. 9 is a block diagram showing the communication of capability parameter data between the FIG. 1 camera and an external host computer.

In the FIG. 9 embodiment, external host computer system 910 issued the GetCameraCapabilities command. In other embodiments of the present invention, the GetCameraCapabilities command may be issued in response to the user pressing one of the buttons and dials 304 (FIG. 3) of the digital camera 110, or by a special parameter script imported into digital camera 110 via removable memory 354 and executed by CPU 344. The capability parameters would then be displayed on LCD screen 302, preferably in the form of a series of menus.

Figure 10:
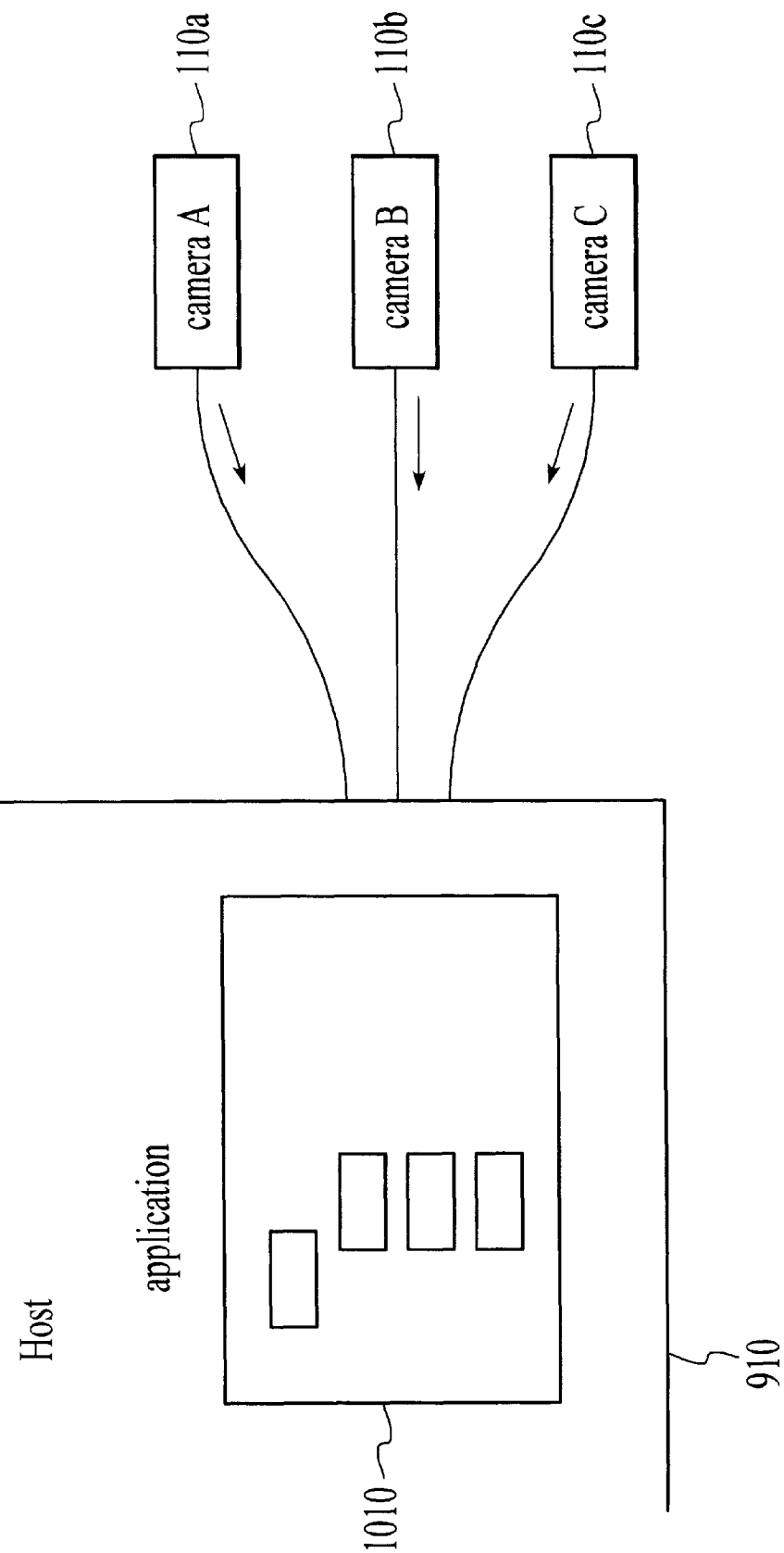
FIG. 10 is a block diagram showing multiple digital cameras connected to a host computer.

Referring now to FIG. 10, one implementation of the present invention is shown. Consider a software application 1010 which was originally shipped with camera A 110(a) and installed on host computer system 910. In the prior art software application 1010 would normally only be configured to interact with connected camera A 110(a). But because of the present invention the external host computer system 910 may be connected to several additional digital cameras, camera B 110(b) and camera C 110(c). In one embodiment, a single USB may connect up to 127 cameras 110 to a given external host computer system 910. With the present invention the application 1010 may then issue the GetCameraCapabilities command to each of the cameras 110(a), 110(b), and 110(c). Application 1010 may then receive and act upon the capability parameters from the three cameras 110 (a, b and c) without having to obtain the capability parameters from floppy disks or by manual entry. Application 1010 may then display the capability parameter data from the three cameras 110 (a, b and c) for the user to read on the display of the external host computer system 910.

It is important to note that the three cameras 110(a, b and c) in FIG. 10 may each support different ranges or a different list of values for each capability parameter. For example, camera 110a may support only 1× and 2× zoom, whereas camera 110b may support 1×, 2×, and 3× zoom. The capability parameter value sets returned from cameras 110a and 110b will reflect the differences in these and other capabilities of the digital cameras.

Figure 11:
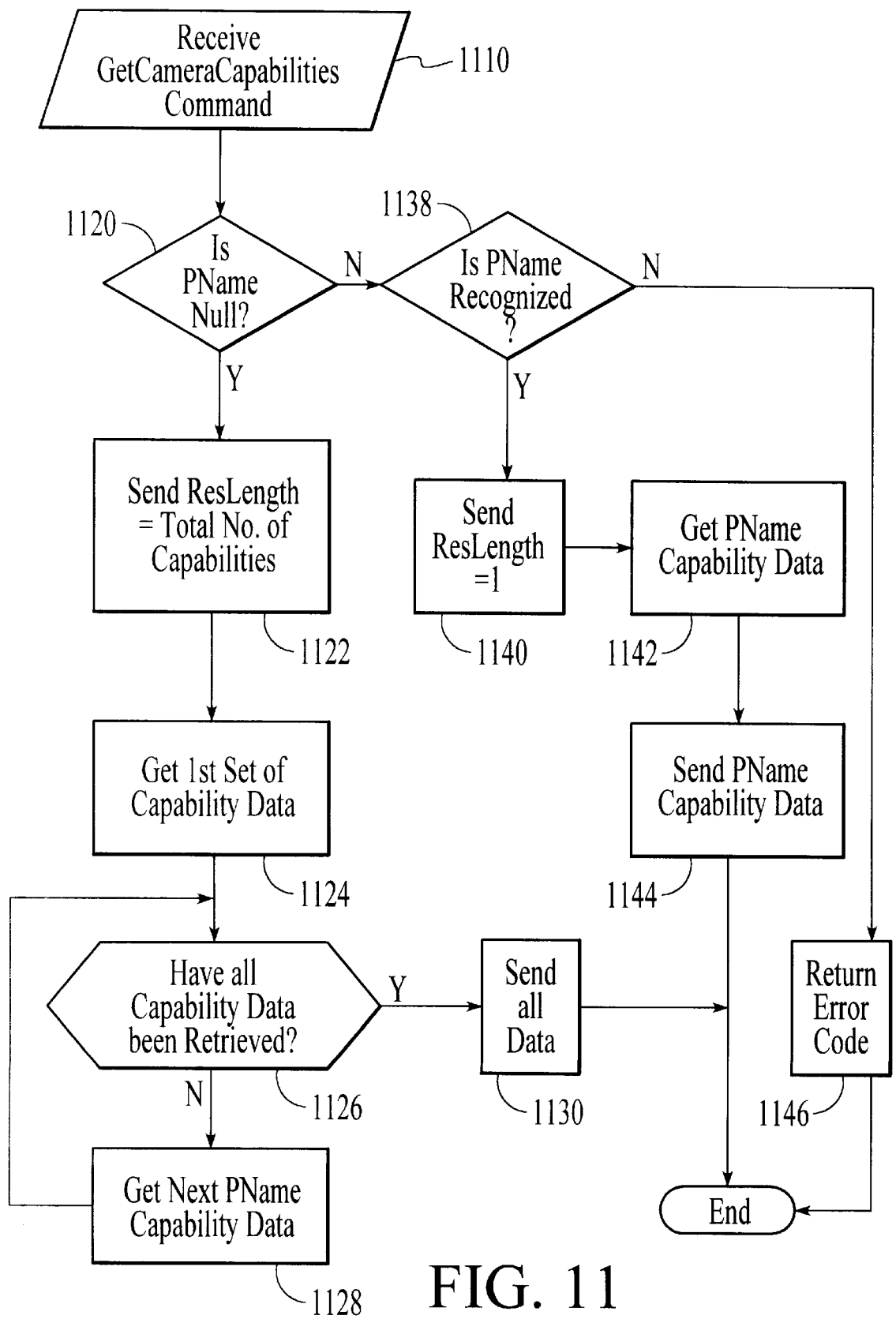
FIG. 11 is a flowchart of method steps for a GetCameraCapabilites command, according to a first embodiment of the present invention.

Referring now to FIG. 11, the processing of the GetCameraCapabilities command within digital camera 110 in accordance with a first embodiment of the invention is shown. In initial step 1110, the parameter manager 410 receives the GetCameraCapabilities command. Then, in step 1120, if the GetCameraCapabilities command has its PName field set to four null characters, the implication is that the external host computer system 910 is requesting a complete set of the capability parameter data from the digital camera. In this case, the unsigned integer ResLength (representing the number of items sent as capability parameters) is sent, in step 1122, as the total number of capability parameters present in digital camera 110. Parameter manager 410 then proceeds, in step 1124, to get the first set of capability parameter data, and, in step 1126, determines if all of the sets of capability parameter data have been retrieved. If not all of the sets have been retrieved, the parameter manager 410, in step 1128, proceeds to get the next set of capability parameter data and then loops back for another decision in step 1126. In this manner the parameter manager 410 retrieves all the sets of capability parameter data. Once the complete set of capability parameter data is retrieved, camera 110 sends the data to the external host computer system 910, in step 1130, and the FIG. 11 process ends.

If, in step 1120, the PName field in the GetCameraCapabilities command was not a set of four null characters, then the parameter manager 410, in step 1138, decides if the value of the PName is for a recognized parameter. If the value of the PName is for a recognized parameter, then the parameter manager 410, in step 1140, sends the ResLength as the number 1, retrieves the capability parameter data corresponding to the value of the PName in step 1142, and sends this data, in step 1144, to the external host computer system 910. If the value of the PName is not for a recognized parameter, then the parameter manager 410, in step 1146, returns an error code.

Figure 12:
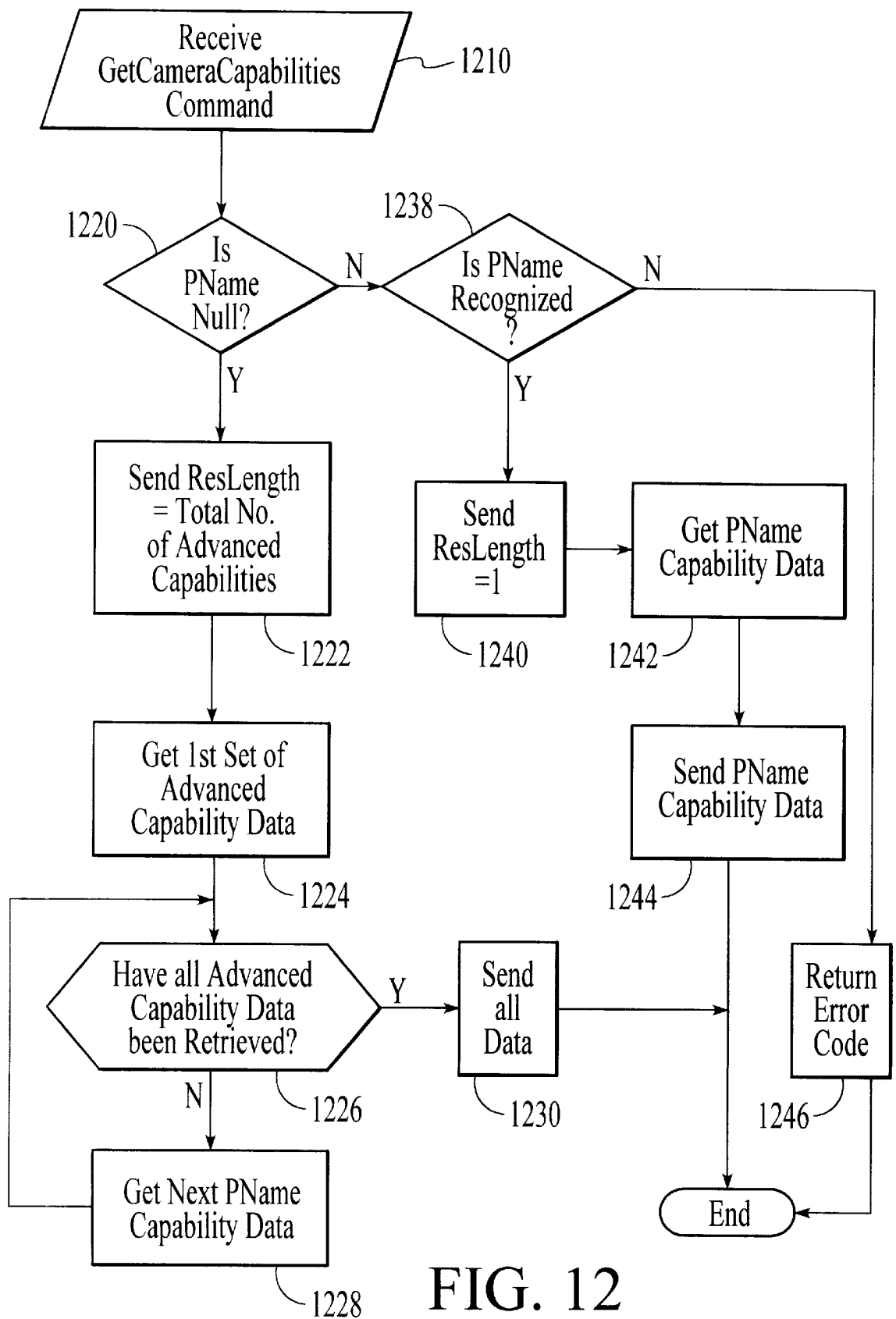
FIG. 12 is a flowchart of method steps for a GetCameraCapabilites command, according to a second embodiment of the present invention.

Referring now to FIG. 12, the processing of the GetCameraCapabilities command within digital camera 110 in accordance with a second embodiment of the present invention is shown. This second embodiment presupposes that the digital camera industry reaches a concurrence about what constitutes a basic core set of standard capability parameters, which will then be common to all digital cameras. The processing in this flowchart is analogous to that shown in FIG. 11, with the exception of what happens following step 1220 if the PName field is set to four null characters. In this case, the ResLength is set, in step 1222, to the total number of capability parameters which are not part of the basic core set, i.e., the total number of advanced capability parameters. Then, during steps 1224, 1226, 1228, and 1230, which get and send the capability parameter data, only the capability parameter data for the advanced capability parameters are retrieved and sent to external host computer system 910. This retrieving of only those capability parameter data which are not part of the basic core set advantageously saves interface time and system resources such as memory.

In the FIGS. 11 and 12 embodiments, the external host computer system 910 issues the GetCameraCapabilities command. As mentioned during the discussion of FIG. 9, in other embodiments of the present invention, the GetCameraCapabilities command may be issued by a system user activating the buttons and dials 304 (FIG. 3) of the digital camera 110, or by a special parameter script imported into the digital camera 110 on the removable memory 354 and executed by the CPU 344.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for retrieving capability parameters in a hand held electronic device comprising:

a series of capability parameter storage locations coupled to said electronic device for containing value sets corresponding to said capability parameters, wherein said one or more of said series of capability parameter storage locations each includes:

a minimum value location containing a minimum capability parameter value;

a maximum value location containing a maximum capability parameter value;

a factory defaults location containing a factory default value; and a list-of-integers location containing a capability parameter list;

a capability command for retrieving said value sets from said capability parameter storage locations; and a parameter manager device coupled to said electronic device for executing said capability command for retrieving said value sets corresponding to said capability parameters wherein the value sets describe the functional capability of the electronic device.

2. The system of claim 1 wherein one or more of said series of capability parameter storage locations each includes:

a capability parameter name location containing a descriptive parameter name; and a descriptive string location containing a parameter description.

3. The system of claim 2 wherein said list-of-integers location includes a factory default integer.

4. The system of claim 2 wherein said series of capability parameter storage locations is located in a non-volatile memory within said electronic device.

5. The system of claim 1 wherein said capability command for retrieving said value sets is a GetCameraCapabilities command which causes said parameter manager to send at least one of said value sets to an external host computer.

6. The system of claim 5 wherein said GetCameraCapabilities command is issued by said external host computer.

7. The system of claim 1 wherein said capability command for retrieving said value sets is a GetCameraCapabilities command, which is issued by a special parameter script.

8. The system of claim 1 wherein said capability command for retrieving said value sets is a GetCameraCapabilities command, which is issued by a user of said electronic device.

9. A method of retrieving capability parameters from a hand held electronic device comprising the steps of:

storing value sets corresponding to said capability parameters into a series of capability parameter storage locations, wherein said one or more of said series of capability parameter storage locations each includes:

a minimum value location containing a minimum capability parameter value;

a maximum value location containing a maximum capability parameter value;

a factory defaults location containing a factory default value; and a list-of-integers location containing a capability parameter list; issuing a capability command for retrieving said value sets from said series of capability parameter storage locations wherein the value sets describe the functional capability of the electronic device; and executing said capability command using a parameter manager device to retrieve said value sets corresponding to said capability parameters.

10. The method of claim 9 wherein one or more of said series of capability parameter storage locations each includes:

a capability parameter name location containing a descriptive parameter name; and a descriptive string location containing a parameter description.

11. The method of claim 10 wherein said list-of-integers location includes a factory default integer.

12. The method of claim 10 wherein said series of capability parameter storage locations is located in a non-volatile memory within said electronic device.

13. The method of claim 9 wherein said capability command for retrieving said value sets is a GetCameraCapabilities command which causes said parameter manager to send at least one of said value sets to an external host computer.

14. The method of claim 13 wherein said GetCameraCapabilities command is issued by said external host computer.

15. A computer-readable medium comprising program instructions for retrieving capability parameters in an electronic device by performing the steps of:

storing value sets corresponding to said capability parameters into a series of capability parameter storage locations, wherein said one or more of said series of capability parameter storage locations each includes:

a minimum value location containing a minimum capability parameter value;

a maximum value location containing a maximum capability parameter value;

a factory defaults location containing a factory default value; and a list-of-integers location containing a capability parameter list;

issuing a capability command for retrieving said value sets from said series of capability parameter storage locations wherein the value sets describe the functional capability of the electronic device; and executing said capability command using a parameter manager device to retrieve said value sets corresponding to said capability parameters.

16. A system for retrieving capability parameters in an electronic device, comprising:

means for storing value sets corresponding to said capability parameters into a series of capability storage locations, wherein said one or more of said series of capability parameter storage locations each includes:

a minimum value location containing a minimum capability parameter value;

a maximum value location containing a maximum capability parameter value;

a factory defaults location containing a factory default value; and a list-of-integers location containing a capability parameter list, said means for storing value sets being coupled to said electronic device;

means for commanding the retrieval of said value sets from said means for storing value sets wherein the value sets describe the functional capability of the electronic device; and means for executing said means for commanding the retrieval of said value sets.

17. The system of claim 16 wherein said electronic device is a digital camera.

* * * * *

(12) INTER PARTES REEXAMINATION CERTIFICATE (1257th)
United States Patent
Anderson et al.

(10) Number: US 6,163,816 C1
(45) Certificate Issued: Apr. 21, 2016

(54) SYSTEM AND METHOD FOR RETRIEVING CAPABILITY PARAMETERS IN AN ELECTRONIC IMAGING DEVICE

(75) Inventors: Eric Anderson, San Jose, CA (US); Patricia Scardino, Fremont, CA (US)

(73) Assignee: FLASHPOINT TECHNOLOGY, INC., San Jose, CA (US)

Reexamination Request:
No. 95/001,420, Aug. 18, 2010

Reexamination Certificate for:
Patent No.: 6,163,816
Issued: Dec. 19, 2000
Appl. No.: 08/920,424
Filed: Aug. 29, 1997

(51) Int. Cl.
*H04N 5/232* (2006.01)
*H04N 1/00* (2006.01)
*H04N 101/00* (2006.01)

(52) U.S. Cl.
CPC .......... *H04N 5/232* (2013.01); *H04N 1/00204* (2013.01); *H04N 2101/00* (2013.01)

(58) Field of Classification Search
None
See application file for complete search history.

(56) References Cited

To view the complete listing of prior art documents cited during the proceeding for Reexamination Control Number 95/001,420, please refer to the USPTO's public Patent Application Information Retrieval (PAIR) system under the Display References tab.

*Primary Examiner* — Ovidio Escalante

(57) ABSTRACT

The present invention includes a system and method for obtaining a set of capability parameters for an electronic imaging device. The invention includes a series of capability parameter storage locations for containing capability parameter value sets, a GetCameraCapabilities command for retrieving these capability parameter value sets, and a parameter manager device for executing the GetCameraCapabilities command to retrieve the capability parameter value sets.

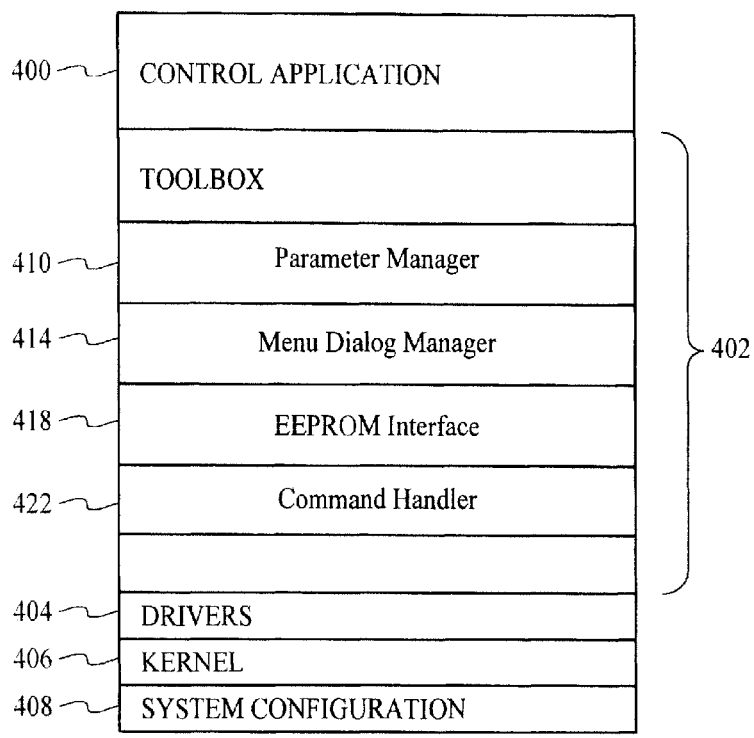

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *